United States Patent [19]

Luke

[11] 4,153,112

[45] May 8, 1979

[54] FLEX JOINT

[75] Inventor: Robert R. Luke, Houston, Tex.

[73] Assignee: Cameron Iron Works, Inc., Houston, Tex.

[21] Appl. No.: 812,049

[22] Filed: Jul. 1, 1977

[51] Int. Cl.² .......................................... E21B 33/035
[52] U.S. Cl. .................................... 166/355; 166/66; 285/93; 285/265
[58] Field of Search ................... 166/0.6, 0.5, 66, 242, 166/355, 367; 175/7, 45; 285/263–265, 93

[56] References Cited

U.S. PATENT DOCUMENTS

| 2,705,890 | 4/1955 | Klose | 285/264 X |
| 3,010,214 | 11/1961 | Postlewaite | 166/0.5 |
| 3,226,977 | 1/1966 | Kolb | 175/7 |
| 3,321,217 | 5/1967 | Ahlstone | 166/0.6 |
| 3,450,421 | 6/1969 | Harwell, Jr. | 166/0.6 |
| 3,977,707 | 8/1976 | Oliver | 285/265 |

Primary Examiner—Ernest R. Purser

[57] ABSTRACT

There is disclosed a flex joint for connecting the upper end of wellhead equipment including a blowout preventer stack with the lower end of a riser pipe which includes means for use in sensing and producing a signal representing the angle between and relative direction of the longitudinal axes of the stack and pipe.

10 Claims, 3 Drawing Figures

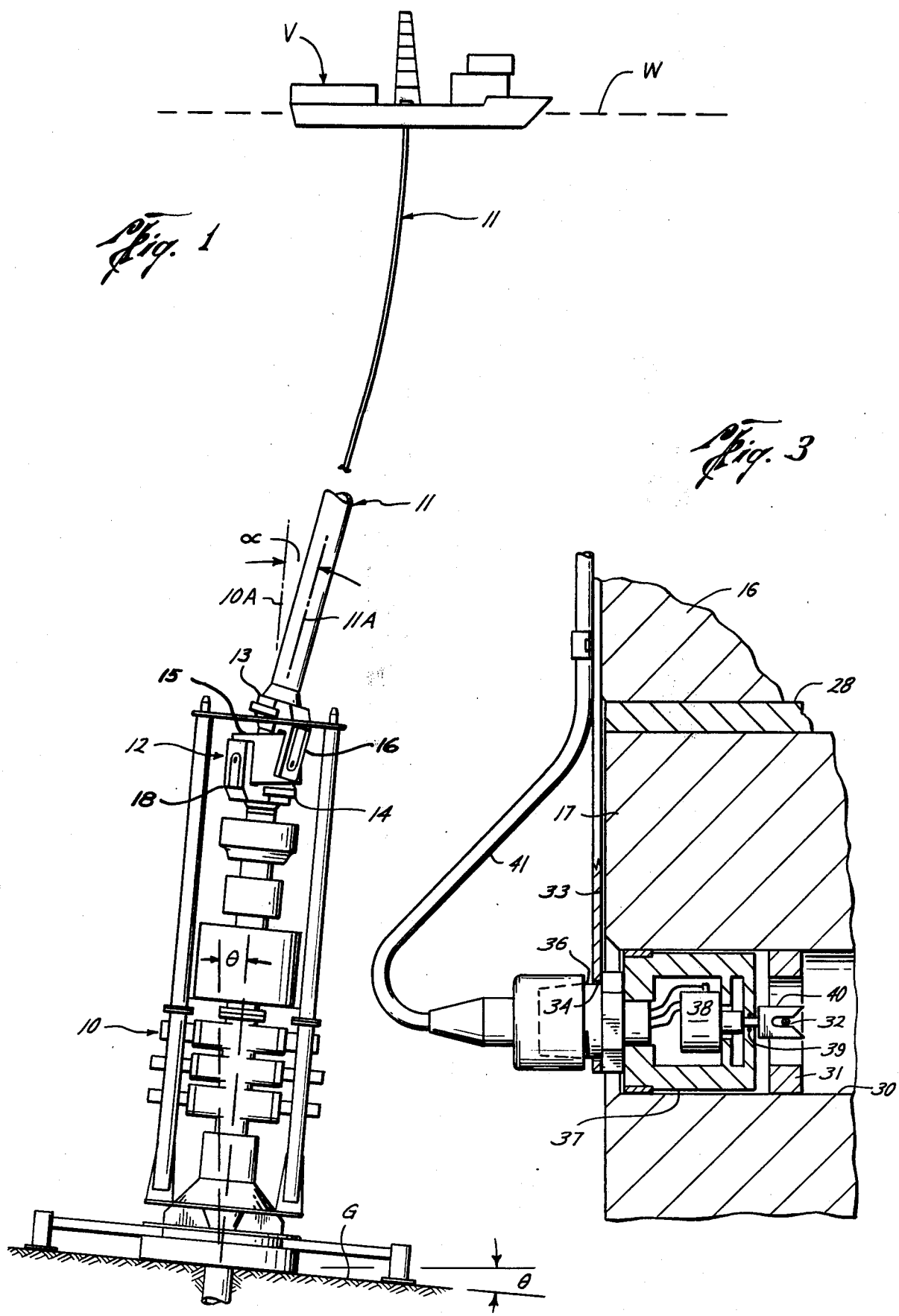

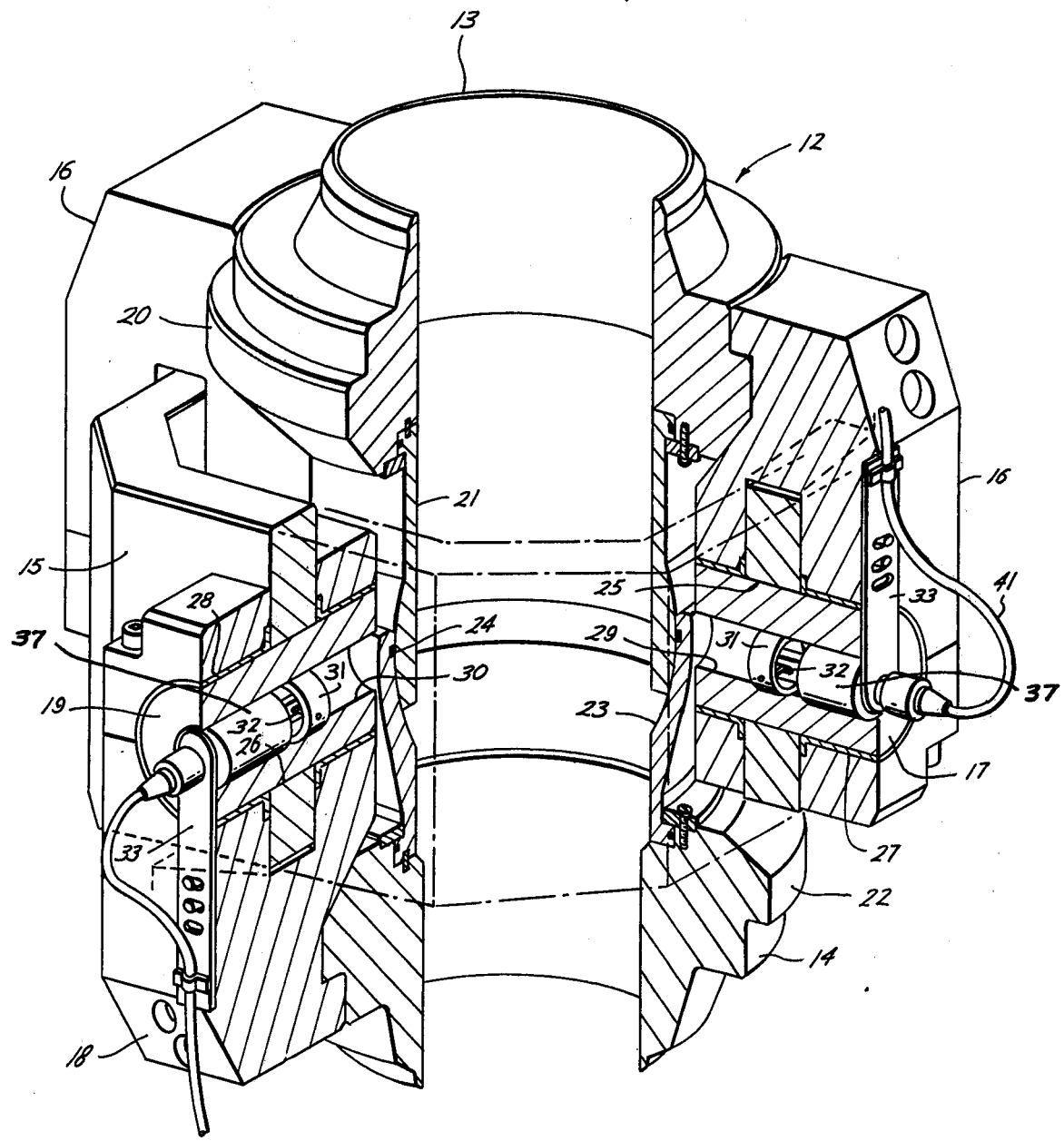

FLEX JOINT

This invention relates to improved apparatus for use in remotely determining the angle between and relative direction of elongate members which are connected for flexing about the intersection of their longitudinal axes.

One environment in which such apparatus finds particular utility is in the drilling and completion of offshore oil and gas wells wherein the lower end of a riser pipe which extends downwardly from water level is connected by a flex or ball joint to offshore wellhead equipment including a blowout preventer stack or production stack mounted on the upper end thereof. During drilling of the well, for example, a drill string extends through the joint for transmitting torque from the rotary table on a drilling vessel to a bit in the well bore on the lower end of the string. If the angle between the axes of the stack and riser pipe is too large, the drill string may cause considerable wear on the inner surfaces of the joint or the bottom of the stack may be overstressed due to the excessive bending moment caused by the riser tension. For this and other reasons it is necessary to determine the angle between and relative direction of their axes, preferably on a continuous basis, in order that the drilling vessel may be moved into a position to bring and maintain the angle within the desired limits.

U.S. Pat. No. 3,977,707, dated Aug. 31, 1976, and entitled "Ball Joint", which is assigned to the assignee of the present application, discloses a preferred form of flex joint including a gimbal ring connected to a first pair of arms on the lower end of a riser pipe to permit the riser pipe to pivot about a first axis, and to a second pair of arms on the upper end of a blowout preventer stack to permit the gimbal ring to pivot about a second axis which intersects and is perpendicular to the first. In this manner, tubular portions on the ends of the joint inwardly of the gimbal ring may be sealed with respect to one another without bearing the load on the joint.

As shown and described in Paper Number OTC1386 published in 1971 by the Offshore Technology Conference, and entitled "Marine Riser Monitoring with Acoustic Ball Joint Angle-Azimuth Indicator", it has been proposed to mount pendulum type potentiometers at 90° intervals about the longitudinal axis of the riser pipe. When connected with a source of electrical energy, which may be at the water level, these potentiometers make it possible to remotely sense and produce signals which represent and thus permit determination of the angular and directional inclination of a riser pipe with respect to the vertical. This, however, determines the angle and direction of the riser pipe with respect to the blowout preventer stack only if the stack is vertical, which is seldom the case.

A Technical Instruction Manual TW511 (effective October 1975) of the Martin-Decker Company, of Santa Ana, California, for its "Automatic Inclination Measurement System" (Models AIM 52 and AIM 53), suggests the use of such potentiometers on both the riser pipe and the stack beneath the flex joint, and thus a means for use in sensing and producing signals representative of the angular and directional inclination of both the riser pipe and the stack with respect to the vertical. However, this provides only an indirect means for use in determining the angle and direction of the riser pipe and stack relative to one another, and thus requires considerble instrumentation.

The primary object of this invention is to provide apparatus of this type which is useful in providing a direct determination of the angle between and relative direction of the riser pipe and wellhead equipment, or other remotely located, flexibly connected elongate members.

Another object is to provide such apparatus which is relatively simple and compact and inexpensive to manufacture.

A further object is to provide such apparatus which is particularly well suited for use with a flex joint of the above-described gimbal type.

These and other objects are accomplished, as in the illustrated embodiment of the invention, by a flex joint having first and second ends connectible in axial alignment with the wellhead equipment and the riser pipe, or with other elongate members, means connecting the ends for flexing about the intersection of their longitudinal axes, and means connected to the connecting means and each of the ends for use in sensing and producing signals representing the angle between and relative direction of said axes. More particularly, a first means is connected to the first end and to the connecting means for use in sensing and producing a first signal representing the angle between and relative direction of the axis of the first end and a first axis of the connecting means, and a second means is connected to the second end and to the connecting means for use in sensing and producing a second signal representing the angle between the axis of the second end and a second axis in the connecting means which is perpendicular to and lies in the same plane as the first axis in the connecting means.

In the illustrated embodiment of the invention, these first and second ends have tubular portions which carry means for sealably engaging one another during flexing of the joint. More particularly, in the illustrated environment, the tubular portions are connected to the upper end of a blowout preventer stack and the lower end of a riser pipe, whereby the apparatus provides a means for use in directly determining the angle between and relative direction of the stack and riser pipe.

Preferably, each end of the joint includes a pair of arms, and the connecting means includes a gimbal ring and pins connecting each pair of arms to the gimbal ring for pivoting about the first and second axes, thus resembling the well known Hooke's joint. In this preferred embodiment of the invention, a first part is fixed to one pin of each pair of pins, a second part is fixed to an arm of each pair of arms, and the means for use in sensing and producing a signal is connected to the first and second parts for use in sensing the direction and extent of relative rotation therebetween about the pivotal axis of the pin. More particularly, each such pin has a hole in it which opens to its outer end, and said means for use in sensing and producing the signal, which preferably comprises a potentiometer, is mounted within each hole.

In the drawings:

FIG. 1 is an elevational view of an underwater blowout preventer stack and a riser pipe connected by means of a flex joint constructed in accordance with the present invention, the riser pipe being discontinued intermediate the joint and a drilling vessel at water level, and the upper portion of the riser pipe being shown on a smaller scale than its lower portion;

FIG. 2 is an enlarged isometric view of the flex joint with its ends in axial alignment and with a portion thereof broken away to illustrate certain of its details; and FIG. 3 is a further enlarged vertical sectional view of a part of the joint, as seen along a plane extending vertically through the axis of one of the pins.

With reference now to the details of the above-described drawings, a blowout preventer stack 10 is shown in FIG. 1 to be mounted at the upper end of wellhead equipment which is fixedly installed on the subsurface level "G" above an offshore well. The upper end of stack 10 is connected to the lower end of a riser pipe 11 by means of a flex joint 12, and the upper end of the riser pipe extends upwardly to a vessel "V" located at the water level "W". As can be seen from FIG. 1, the subsurface ground level "G" is not horizontal, and thus forms an angle $\theta$ with the water level "W". Furthermore, the lower end of the riser pipe is not axially aligned with the stack 10, but instead its axis 11A forms an angle $\alpha$ with the axis 10A of the stack. Thus, axis 11A of the lower end of the riser pipe extends at an angle with respect to the vertical which, when $\theta$ and $\alpha$ lie in the same plane, is equal to the sum of angles $\theta$ and $\alpha$.

As shown in FIG. 2, flex joint 12 includes a first end 13 which includes a tubular portion connected in axial alignment with the lower end of riser pipe 11, and a second end 14 which includes a tubular portion connected in axial alignment with stack 10. The tubular portions are in turn pivotally connected to a gimbal ring 15 in such a manner that they are free to flex with respect to one another. Thus, a first pair of arms 16 is fixedly connected to the tubular portion of end 13 and pivotally connected to opposite sides of gimbal ring 15 by means of a pair of coaxial pivot pins 17, and a second pair of arms 18 is fixedly connected to the tubular portion of end 14 and pivotally connected to opposite sides of the gimbal ring, intermediate the arms 16, by means of a pair of coaxial pivot pins 19.

The axes of the pins 17 and 19 are perpendicular to the axes 10A and 11A of the tubular portions, pins 17 providing a first axis about which end 13 and thus the lower end of riser pipe 11 are free to rotate relative to gimbal ring 15, and pins 19 providing a second axis about which the gimbal ring is free to rotate relative to the other end 14 and thus the stack.

The tubular portion of end 13 has an upper enlarged end 20 to which the upper ends of arms 16 are connected, and a lower reduced end 21 which extends downwardly within arms 16 below the plane in which the axes of the pins 17 and 19 lie. The tubular portion of end 14 has a lower enlarged end 22 to which the lower ends of arms 18 are connected and an upper reduced end 23 which extends upwardly within arms 18 about the lower end of tubular portion 13. As shown in FIG. 2, reduced end 21 has a convex spherical surface which fits closely within a concave spherical surface on reduced end 23, and a seal ring 24 is carried within a groove in the concave surface for sealing with respect to the convex surface as the ends 13 and 14 of the joint flex with respect to one another.

Pins 17 are fixedly pressed into holes 25, and pins 19 are fixedly pressed into holes 26, within the gimbal ring 15. Arms 16 are rotatably mounted about pins 17 by means of bearings 27, and arms 18 are rotatably mounted about pins 19 by means of bearings 28. In the compact arrangement shown, gimbal ring 15 fits within slots in the lower ends of arms 16 and in the upper ends of arms 18, each arm being made of releasably connected parts which permit their assembly over the upper and lower halves of the pins.

A cylindrical hole 29 is formed coaxially within one pin 17, and a cylindrical hole 30 is formed coaxially within one pin 19, each to receive a rotary potentiometer 38 (FIG. 3) for use in sensing and producing signals representing the angle between and relative direction of the pin with respect to the arm and thus the end of the joint to which it is connected. Since the potentiometers, as well as the means connecting them to the pins and arms, are identical, the same reference characters will be used in connection with their description to follow.

A plate 33 is fixedly connected to each of the arms 16 and 18 connected to the pins in which rods 32 are mounted to dispose the free end of the plate over the outer end of the hole in the pin. A non-circular hole 34 is formed in the outer end of each plate to closely receive a correspondingly non-circular part of a connector 36 which extends from the potentiometer through the outer end of a housing 37.

A ring 31 is fixedly secured in the hole of each pin with a rod 32 extending diametrically across it, and a shaft 39 which extends from the potentiometer through the inner end of a housing 37 along the axis of the pin has a fork 40 on its outer end whose slot closely receives rod 32. Shaft 39 is connected to the moveable contact of the potentiometer so that when connected to a source of electrical energy, the potentiometer senses and produces a signal which represents relative rotation between the rod and plate, and thus between the pin and arm, in response to relative rotation of the gimbal ring and the end of the joint. Electrical energy from a suitable source at water level may be transmitted to the potentiometer, and the electrical signal may be transmitted from the potentiometer to water level through cables 41 extending through connector 36.

As previously described, the pivotal axes of pins 17 and 19 lie within a common plane which is perpendicular to the axis of gimbal ring 15 as well as to the axes of the ends of the joint when aligned. The extent of each potentiometer 38 may be arranged to include the permissible range of rotative movement about each of axes 10A and 11A, whereby the minimum reading represents the maximum rotation in one direction, and the maximum reading the maximum rotation in the other direction. Consequently, rotation to one side or the other of an axis perpendicular to the plane, and thus not only the extent but also the direction of their angular inclination, is indicated by signals from the potentiometer representing readings either above or below the reading intermediate maximum and minimum. When riser pipe 11 deviates from alignment with stack 10, as shown in FIG. 1, end 13 rotates about the axes of one or both pairs of pins 17 and 19, and signals representing the extent and direction of such rotations are communicated to a desired location where they may be combined, as explained in the aforementioned manual of the Martin-Decker Company, to determine the amount and direction of angle $\alpha$. These may be indicated for readout and an alarm may be attached to warn of approach to a limiting amount. The amount and direction of angle $\theta$ may be determined by any acceptable means when the stack is set, and remain substantially constant.

From the foregoing, it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A flex joint for connecting elongate members, comprising a first end connectible in axial alignment with a first of said members, a second end connectible in axial alignment with the second member, means connecting the first and second ends for flexing about the intersection of their longitudinal axes, said first and second ends having tubular portions which carry means thereon for sealably engaging one another during flexing of the joint, and means connected to the connecting means and each of said first and second ends for use in sensing and producing signals representing the angle between and relative direction of said axes, each of said first and second ends also having a pair of arms, said connecting means including a gimbal ring externally disposed about the tubular portions and a pair of pins connecting each pair of arms to the gimbal ring for pivoting about axes perpendicular to one another, and said means for use in sensing and producing said signals comprises a first part fixed to a pin of each pair of pins, a second part fixed to an arm of each pair of arms, and means connected to said parts for use in sensing the direction and extent of relative rotation therebetween about the pivotal axis of the pin.

2. A flex joint of the character defined in claim 1, wherein one pin of each pair has a hole therein opening to the outer end thereof, and said means for use in sensing and producing said signal is mounted within said hole.

3. A flex joint for connecting elongate members comprising a first end connectible in axial alignment with a firs of said members, a second end connectible in axial alignment with the second member, means connecting the first and second ends for flexing about the intersection of their axes, said first and second ends having tubular portions which carry means thereon for sealably engaging one another during flexing of the joint, means connected to the first end and to the connecting means for use in sensing and producing a signal representing the angle between and relative direction of the axis of the first end and a first of the connecting means, and means connected to the second end and to the connecting means for use in sensing and producing a signal representing the angle between and relative direction of the axis of the second end and a second axis of the connecting means and which is perpendicular to and lies in the same plane as the first axis of the connecting means, each of said first and second ends also having a pair of arms, said connecting means including a gimbal ring disposed externally about the tubular portions and a pair of pins connecting each pair of arms to the gimbal ring for pivoting about said first and second axes, and said means for use in sensing and producing said signals comprises a first part fixed to a pin of each pair of pins, a second part fixed to an arm of each pair of arms, and means connected to said parts for use in sensing the direction and extent of relative rotation therebetween.

4. A flex joint of the character defined in claim 3, wherein one pin of said pair of pins has a hole therein opening to the outer end thereof, and said means for use in sensing and producing said signal is mounted within said hole.

5. Offshore well apparatus, comprising offshore wellhead equipment, a riser pipe extending from the equipment to a floating object at water level, means connecting the upper end of the equipment to the lower end of the riser pipe for flexing about the intersection of the longitudinal axes, the ends of the stack and riser pipe having tubular portions which sealably engage one another during flexing, and means connected to the connecting means and to the ends of the equipment and riser pipe for use in sensing and producing signals representing the angle between the relative direction of their longitudinal axes, the end of each of the stack and riser pipe having a pair of arms, said connecting means including a gimbal ring disposed externally about the tubular portions and a pair of pins connecting each pair of arms to the gimbal ring for pivoting about axes perpendicular to one another, and said means for use in sensing and producing said signals comprises a first part fixed to a pin of each pair of pins, a second part fixed to an arm of each pair of arms, and means connected to said parts for use in sensing the direction and extent of relative rotation therebetween.

6. Apparatus of the character defined in claim 5, wherein one pin of each pair has a hole therein opening to the outer end thereof, and said means for use in sensing and producing said signal is mounted within said hole.

7. A flex joint for connecting elongate members, comprising a first end connectible in axial alignment with a first of said members, a second end connectible in axial alignment with the second member, means connecting the first and second ends for flexing about the intersection of their longitudinal axes, and means connected to the connecting means and each of said first and second ends for use in sensing and producing signals representing the angle between and relative direction of said axes, each of said first and second ends also having a pair of arms, said connecting means including a gimbal ring disposed externally about the first and second ends and a pair of pins connecting each pair of arms to the gimbal ring for pivoting about axes perpendicular to one another, and said means for use in sensing and producing said signals comprises a first part fixed to a pin of each pair of pins, a second part fixed to an arm of each pair of arms, and means connected to said parts for use in sensing the direction and extent of rotation therebetween about the pivotal axis of the pin.

8. A flex joint of the character defined in claim 7, wherein one pin of each pair has a hole therein opening to the outer end thereof, and said means for use in sensing and producing said signal is mounted within said hole.

9. A flex joint for connecting elongate members, comprising a first end connectible to axial alignment with a first of said members, a second end connectible in axial alignment with the second member, means connecting the first and second ends for flexing about the intersection of their axes, means connected to the first end and to the connecting means for use in sensing and producing a signal representing the angle between and relative direction of the axis of the first end and a first of the connecting means, and means connected to the second end and to the connecting means for use in sensing and producing a signal representing the angle between and relative direction of the axis of the second end and a second axis of the connecting means and which is perpendicular to and lies in the same plane as the first axis of the connecting means, each of said first and second ends also having a pair of arms, said connecting means including a gimbal ring disposed externally about the first and second ends and a pair of pins connecting each pair of arms to the gimbal ring for pivoting about said first and second axes, and said means for use in sensing and producing said signals comprises a first part fixed to a pin of each pair of pins, a second part fixed to an arm of each pair of arms, connected to said parts for use in sensing the direction and extent of relative rotation therebetween.

10. A flex joint of the character defined in claim 9, wherein one pin of said pair of pins has a hole therein opening to the outer end thereof, and said means for use in sensing and producing said signal is mounted within said hole.

* * * * *